United States Patent
Ewert et al.

(10) Patent No.: US 9,556,049 B2
(45) Date of Patent: Jan. 31, 2017

(54) METHOD FOR TREATING SEWAGE SLUDGE AND WASTEWATER TREATMENT PLANT

(75) Inventors: Wolfgang Ewert, Hamburg (DE); Michael Sievers, Clausthal-Zellerfeld (DE); Hinnerk Bormann, Vienenburg (DE)

(73) Assignee: CNP—TECHNOLOGY WATER AND BIOSOLIDS GMBH, Hamburg (DE)

( * ) Notice: Subject to any disclaimer, the term of this patent is extended or adjusted under 35 U.S.C. 154(b) by 241 days.

(21) Appl. No.: 14/343,087

(22) PCT Filed: Sep. 10, 2012

(86) PCT No.: PCT/EP2012/067653
§ 371 (c)(1),
(2), (4) Date: Aug. 20, 2014

(87) PCT Pub. No.: WO2013/034765
PCT Pub. Date: Mar. 14, 2013

(65) Prior Publication Data
US 2014/0374348 A1    Dec. 25, 2014

(30) Foreign Application Priority Data
Sep. 9, 2011   (DE) .................. 10 2011 112 780

(51) Int. Cl.
*C02F 11/04* (2006.01)
*C02F 3/28*  (2006.01)
(Continued)

(52) U.S. Cl.
CPC .............. *C02F 11/04* (2013.01); *C02F 3/1215* (2013.01); *C02F 3/1221* (2013.01); *C02F 3/28* (2013.01);
(Continued)

(58) Field of Classification Search
CPC ....... C02F 11/04; C02F 3/1215; C02F 3/1221; C02F 3/28; C02F 2101/105; C02F 2203/00; Y02W 10/15
(Continued)

(56) References Cited

U.S. PATENT DOCUMENTS

| 4,874,519 A | * | 10/1989 | Williamson | ............... C02F 3/04 |
| | | | | 210/605 |
| 2010/0282674 A1 | * | 11/2010 | Barak | ................... C02F 1/5245 |
| | | | | 210/631 |
| 2011/0014684 A1 | * | 1/2011 | Ewert | ................... C02F 3/1221 |
| | | | | 435/262.5 |

FOREIGN PATENT DOCUMENTS

CH      527 130        10/1972
DE  10 2005 002 066     7/2006
(Continued)

OTHER PUBLICATIONS

Daniel Stumpf; "Phosphorrecycling durch MAP-Faellung im kommunalen Faulschlamm"; Bericht fuer das Umweltbundesamt, Berlin, 2007, entire document.

*Primary Examiner* — Fred Prince
(74) *Attorney, Agent, or Firm* — Whitham, Curtis & Cook, P.C.

(57) ABSTRACT

The invention describes a method for treating sewage sludge through the treatment steps of hydrolyzing (2) the sewage sludge (1) and digesting (11) the hydrolyzed sewage sludge (10), which has undergone hydrolysis (2), for the anaerobic treatment of the sewage sludge (1), and through the step of separating phosphate from the at least partially treated sewage sludge (3). Phosphate is separated after the treatment step of hydrolyzing (2) and before the treatment step of digesting (11) the hydrolyzed sewage sludge (3), wherein the sewage sludge (10), without the phosphate portion (Continued)

separated in the phosphate separation step, is fed to the anaerobic treatment performed through digestion (11).

12 Claims, 4 Drawing Sheets

(51) Int. Cl.
 *C02F 3/12* (2006.01)
 *C02F 101/10* (2006.01)
(52) U.S. Cl.
 CPC ...... *C02F 2101/105* (2013.01); *C02F 2203/00* (2013.01); *Y02W 10/15* (2015.05)
(58) Field of Classification Search
 USPC .................. 210/603, 612, 613, 631, 906
 See application file for complete search history.

(56) References Cited

FOREIGN PATENT DOCUMENTS

| | | |
|---|---|---|
| EP | 0 799 811 | 10/1997 |
| EP | 1 364 915 | 11/2003 |
| WO | 88/04282 | 6/1988 |
| WO | 2009/112208 | 9/2009 |

\* cited by examiner

METHOD FOR TREATING SEWAGE SLUDGE AND WASTEWATER TREATMENT PLANT

FIELD OF THE INVENTION

The invention relates to a method for treating sewage sludge, comprising the treatment steps of hydrolysis of the sewage sludge and of digestion of the hydrolyzed sewage sludge, subjected to the hydrolysis, in order to anaerobically treat the sewage sludge, and also comprising a step of removal of phosphate from the at least partially treated sewage sludge.

The invention further relates to a wastewater treatment plant for treating sewage sludges using such a method, comprising a hydrolysis apparatus for the hydrolysis treatment of sewage sludge, a digestion vessel for the anaerobic treatment of sewage sludge by digestion, and comprising a separation apparatus for the removal of phosphate from the sewage sludge.

BACKGROUND OF THE INVENTION

Wastewater treatment generally gives rise to sewage sludge (primary, activated and tertiary sludge) which contains in concentrated form the majority of the ingredients eliminated from the wastewater. This comprises plant nutrients such as phosphorus and nitrogen, and also organic and inorganic ingredients. To stabilize and to reduce the volume of sewage sludges, anaerobic treatment is performed in digestion vessels. During this sludge digestion, the degradation of organic substrate releases not only the digester gas which arises, but also organically bound nitrogen and phosphorus compounds. This method and the removal of phosphate are described in "Auswirkungen der thermischen Klärschlammhydrolyse und der prozessintegrierten Nährstoffrückgewinnung auf die Stoffstrom-und Energiebilanzen auf Kläranlagen" ("Effects of thermal sewage sludge hydrolysis and of process-integrated nutrient recovery on the material-flow and energy balances on sewage plants"), final report AZ 24507-23, H. Bormann, M. Sievers, W. Ewert, published by Deutsche Bundesstiftung Umwelt (German Federal Foundation for the Environment), 2010 (http://www.dbu.de/projekt_24507/_db_1036.html). The removal of phosphate from the wastewater is achieved in practice by chemical precipitation with iron/aluminum salts or by increased biological P uptake into microorganisms (Bio-P). To increase the phosphorus recovery potential, thermal hydrolysis of surplus sludge and subsequent separate digestion of the surplus sludge is proposed. During the thermal hydrolysis, there is a partial redissolution of phosphorus and nitrogen from the solids of the surplus sludge. Phosphate recovery is achieved by phosphate precipitation of the redissolved phosphorus portion in the anaerobically treated surplus sludge.

D. Stumpf: "Phosphor Recycling durch MAP-Fällung im kommunalen Faulschlamm" ("Phosphorus recycling by MAP precipitation in communal digester sludge"), Umweltbundesamt Berlin (Federal Environmental Agency in Berlin), 2007 describes various methods and appliances for removing phosphorus by precipitating magnesium ammonium phosphate (MAP) from sewage sludge. Traditionally, this is carried out after the anaerobic treatment of sewage sludge, i.e., surplus sludge and/or primary sludge. The MAP precipitation is generally carried out using precipitation reactors or fluidized-bed reactors in which the pH is increased by addition of alkaline solution or by air stripping. MAP is traditionally precipitated directly from the digester sludge or from process water of sludge dewatering. The precipitated MAP can then be removed by means of sieves, hydrocyclone or centrifuges. In some cases, it then has to be further processed in order to be able to be used as, for example, fertilizer.

The methods carried out after completed digestion process in order to remove magnesium ammonium phosphate (MAP) prevent undesired crystallizations, which can frequently lead to operational interruptions. Here, advantage is taken of the known fact that, after use of biological phosphate elimination, the majority of the stored polyphosphates in the surplus sludge are redissolved under anaerobic conditions as orthophosphates in exchange for organic acids. This effect is utilized in the recovery of phosphates by the phosphates being precipitated and removed as magnesium ammonium phosphate (MAP) in either the digested sludge or the separated sludge water. The magnesium source used is generally magnesium chloride, magnesium oxide or magnesium hydroxide.

In the case of the redissolution of phosphates from the surplus sludge or raw sludge, preference is given to the phosphate exchange processes which occur under anaerobic conditions. The disadvantage here is that it is necessary to work with relatively large volumes and that relatively low phosphate concentrations are obtained.

EP 1 364 915 A1 discloses a method for reducing phosphate from sewage sludge. In said method, wastewater is fed to aerobic treatment after the anaerobic treatment and sludge recycled from a settling tank is subjected to anaerobic treatment. The liquid phase is then fed to an apparatus for removing phosphate, for example a MAP reactor.

WO 2009/112208 A2 discloses a method for wastewater treatment and a wastewater treatment plant for this purpose, in which hydrolyzed and subsequently anaerobically treated surplus sludge is fed to a precipitation unit in order to remove phosphate. There, magnesium ammonium phosphate (MAP) is precipitated from the processed hydrolyzed and anaerobically treated surplus sludge by addition of magnesium salts with the setting of an appropriate pH of from 7.5 to 7.8.

SUMMARY

Proceeding from this, it is an object of the present invention to provide an improved method for treating sewage sludge and also an improved wastewater treatment plant for treating sewage sludges using such a method.

The object is achieved by the method and also by the wastewater treatment plant.

Advantageous embodiments are described in the dependent claims.

It is proposed that the removal of phosphate is carried out after the treatment step of hydrolysis and before the treatment step of digestion of the hydrolyzed sewage sludge. In this method, the sewage sludge reduced as a result of the removal of phosphate by this removed proportion of phosphate is fed to the anaerobic treatment by digestion.

In the context of the present invention, sewage sludge is understood to mean wastewater, including industrial process water, in any desired stage of processing, for example primary sludge, surplus sludge or sludge water.

The removal of phosphate before the anaerobic treatment by digestion improves the digestion and, surprisingly, achieves a higher gas yield.

In the context of the present invention, phosphate is understood to mean all phosphate-containing compounds and mixtures, including magnesium ammonium phosphate (MAP).

According to the teaching of the present invention, the removal of phosphate before the digestion is carried out after the step of hydrolysis. Here, advantage is taken of the fact that the phosphate content in the hydrolysate is increased by the hydrolysis. After the hydrolysis, optimal conditions for removing phosphate, more particularly optimal precipitation conditions, are actually not present in the hydrolyzed sewage sludge. However, it has been found that this disadvantage can be effectively compensated for by appropriate method implementation and particularly by the surprising effect of an improved digestor gas yield.

An additional achievement of the removal of phosphate after the hydrolysis and before the digestion is that undesired crystallizations, which can lead to operational interruptions, are avoided.

Thermal hydrolysis or thermal/chemical hydrolysis are especially suitable for the hydrolysis.

The removal of phosphate is preferably achieved by precipitation with the addition of metal salts, more particularly magnesium-containing precipitants, which is generally referred to as magnesium. The magnesium precipitant used can be, for example, magnesium chloride, magnesium oxide or magnesium hydroxide.

The removal of phosphate is preferably achieved by precipitating magnesium ammonium phosphate (MAP) from the hydrolyzed sewage sludge.

Preferably, a subquantity of the sewage sludge treated at least semianaerobically in the step of digestion is recirculated, for example in the form of a separated liquid phase. The subquantity should be selected such that a sufficient quantity of ammonium is available for the precipitation of the phosphate. In some cases, this has the secondary effect that the pH is raised, making it possible to reduce the use of additional agents for necessary raising of pH.

It is especially advantageous when a subquantity of sewage sludge treated at least anaerobically in the step of digestion is recycled to the hydrolyzed sewage sludge before or during the treatment step of removal of phosphate. This makes it possible to adjust the conditions required for MAP precipitation, with reduction of additives required for this purpose through to omission of said additives.

The removal of phosphate after the hydrolysis, but before the digestion, has inherently the disadvantage that the pH of the hydrolyzed sewage sludge is too low for the removal of phosphate. In addition, additional organic solids are degraded during the process of digestion, which organic solids inherently lead to a further release of phosphate and would thus allow a higher phosphate concentration for the precipitation of phosphate after the step of digestion. Moreover, dissolved ammonium is present distinctly overstoichiometrically after the digestion, and so the precipitant requirement would be inherently lower in the case of removal of phosphate after the step of digestion.

The removal of phosphate before the digestion is initially carried out once under conditions which are less optimal than the removal of phosphate after the digestion. However, the partial recirculation of digested sewage sludge makes it possible to increase the pH of the hydrolyzed sewage sludge and to minimize the otherwise necessary addition of alkaline solution and acid through to dispensation with said addition. Moreover, recirculation of a subquantity of sewage sludge treated at least semianaerobically makes it possible, without separate addition of ammonium or with reduced addition of ammonium, to increase the ammonium content of the hydrolyzed sewage sludge, from which phosphate is removed, to such an extent that optimized precipitation of magnesium ammonium phosphate (MAP) is made possible.

It is advantageous when, in the treatment step of removal of phosphate, the phosphate is removed from a sewage sludge mixture or from sludge water as liquid phase after a preceding separation of solid phase and liquid phase from the sewage sludge.

The removal of phosphate from sludge water has the advantage that a crystal size adapted to requirements can be grown. This offers the possibility of simplified sedimentation or filtration of the crystals to be removed. Compared to traditional precipitation of phosphate after the digestion, it is possible to generate a relatively fine and homogeneous crystal structure, favoring the efficiency of removal. In addition, it is possible to obtain largely clean crystals, which do not require additional washes.

By comparison, the removal of phosphate from hydrolyzed sludge has, compared to the removal from digested sludge, the advantage that the ratio of crystal structure to sludge particle structure is distinctly different in the precipitation of MAP in the hydrolysate, thereby making it possible to realize improved MAP crystal removal, for example by means of a centrifuge decanter, from the sludge mixture and thus a higher yield. In addition, failures in the removal of MAP by machine are avoided because the crystal structure is relatively fine compared to the precipitation of MAP after the digestion and no large crystals are grown.

It is especially advantageous when the sewage sludge subjected to the treatment step of hydrolysis, of phosphate removal and of digestion is surplus sludge without any proportions of primary sludge.

The recirculation of a subquantity of sewage sludge treated semianaerobically in the step of digestion to the hydrolyzed sewage sludge before or during the treatment step of removal of phosphate also comprises the especially advantageous embodiment of the method according to the invention, in which the precipitation of MAP is carried out in a short-term high-load anaerobic stage with simultaneous precipitation of MAP. In said precipitation, methane-containing digester gas is simultaneously generated. The longer residence time of the hydrolysate in the anaerobic high-load stage compared to the pure precipitation reactor additionally allows the generation and removal of larger, sedimentable crystals. Moreover, the partial digestion of the hydrolysate releases sufficient ammonium, making it possible to minimize the recirculation of digester sludge. A further advantage is that, as a result of the partial degradation of the organic acids which arise during the hydrolysis, a sufficient pH shift already takes place.

The object is further achieved by a wastewater treatment plant of the type mentioned at the outset by the separator apparatus being connected between the hydrolysis apparatus and the digestion vessel, and so phosphate is removed (subtracted) from the hydrolyzed sewage sludge and the sewage sludge reduced as a result of the removal of phosphate by this removed proportion of phosphate is fed to the anaerobic treatment by digestion.

For the process of removal of phosphate by precipitation, ammonium is required. The $NH_4$ source used can be, for example, ammonia water.

It is especially advantageous when the hydrolysis apparatus is set up for the hydrolysis treatment of sewage sludge such that the pH of the hydrolyzed sewage sludge is already more than 7 and is preferably in the range of 10 to 12. As an alternative or in addition to this, the chemical-thermal hydrolysis treatment can also be set such that the temperature of the hydrolyzed sewage sludge during the hydrolysis is more than 60° C. and is preferably in the range of 70° C. to 90° C. This ensures that, for the subsequent step of phosphate precipitation, there are already optimized conditions for the redissolution of phosphate and precipitation of MAP. This method is especially suitable for chemical-thermal hydrolysis using heat energy (thermal) and chemicals as additives.

Also conceivable is the option that the hydrolysis apparatus is set up for the hydrolysis treatment of sewage sludge in such a way that the temperature of the hydrolyzed sewage sludge during the hydrolysis is more than 100° C. and is preferably in the range of 120° C. to 170° C. This has the advantage that hydrolysis of highly thickened sewage sludge is also possible. In addition, this allows a reduction (chemical-thermal hydrolysis) and possibly the omission (i.e., pure thermal hydrolysis) of the addition of chemicals.

Whereas the hydrolysis at a temperature of less than 100° C. takes place unpressurized under atmospheric pressure, the hydrolysis at a temperature of more than 100° C. is carried out under elevated pressure above atmospheric pressure, i.e., at the vapour pressure present in a pressure vessel of the hydrolysis apparatus.

DESCRIPTION OF THE DRAWINGS

The invention will now be more particularly elucidated by reference to exemplary embodiments with the attached drawings. The following are shown.

DETAILED DESCRIPTION

Figure 1:
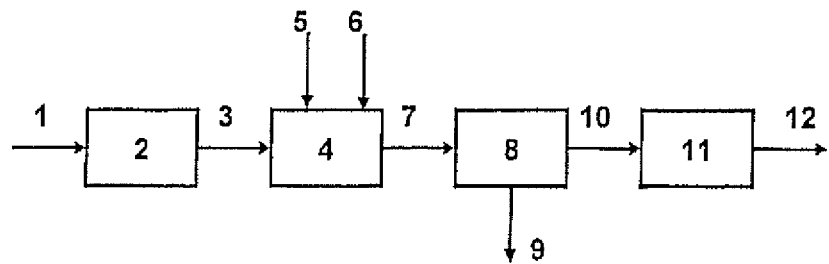
FIG. 1—Block diagram of a first embodiment of the method for treating sewage sludge.

FIG. 1 shows a block diagram of a first embodiment of a method for treating sewage sludge. In said embodiment, sewage sludge 1 in the form of primary sludge and/or surplus sludge is fed to hydrolysis 2. The hydrolysis 2 can be, for example, a thermal hydrolysis or a thermal-chemical hydrolysis. It has been found that a very high concentration of orthophosphate is formed in the thermal hydrolysis with treatment of the sewage sludge 1 for about 30 min at a temperature of 120° C. to 180° C. Crystallization of magnesium ammonium phosphate (MAP) hardly takes place in this range, since anaerobic conversion has not yet taken place and thus only little ammonium, necessary for the crystallization of MAP, has been formed.

Present after the hydrolysis 2 is hydrolyzed sewage sludge 3, which has in practice a pH of about 5 to 6. This is too low for the formation of MAP in the subsequent step of removal 4 of MAP, for example by precipitation. For the step of removal 4 of phosphate by precipitation, precipitant 5 is added, for example MgO, i.e., metal salts. In addition, ammonium-containing solution 6 is added.

The hydrolysate 7 now containing MAP crystals is then fed to removal 8 of MAP by machine. The removal of MAP by machine is known per se and can be carried out with, for example, a centrifuge. The MAP 9 obtained as a result of the removal of magnesium ammonium phosphate (MAP) by machine is conducted away and can be fed to further utilization, if necessary to further processing.

The sewage sludge 10 which is hydrolyzed and reduced by the removed phosphate in the form of the phosphate-containing mixture MAP 9, i.e., the low-phosphate hydrolysate, is subsequently fed to anaerobic treatment by digestion 11, for example in a digestion vessel. Present at the outlet of the digestion is, then, digestor sludge 12, which can be disposed of or processed further.

Figure 2:
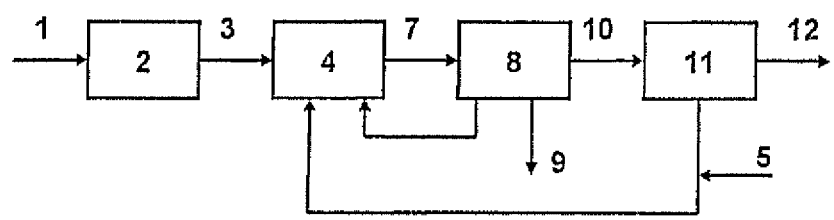
FIG. 2—Block diagram of a second embodiment of the method for treating sewage sludge.

FIG. 2 shows a second embodiment of the method for treating sewage sludge. Here, in the process of digestion 11, at least partially digested sewage sludge or sludge water is partially recycled into the process of removal 4 of phosphate. In this recycling, precipitant 5 can be mixed into the recycled, at least partially digested sludge or sludge water, for example magnesium salts, more particularly MgO. This can minimize the addition of alkaline solution and acid through to dispensation with said addition and nevertheless achieve an increase in the pH of the hydrolyzed sewage sludge 3 that is required for the precipitation of MAP.

In addition, in contrast to the first embodiment according to FIG. 1, this variant has an at least partial recirculation of phosphate-containing crystals, more particularly fine-grain MAP, to the step of precipitation 4 of phosphate, i.e., into the precipitation reactor. This can support and improve the crystallization in the precipitation reactor.

Figure 3:
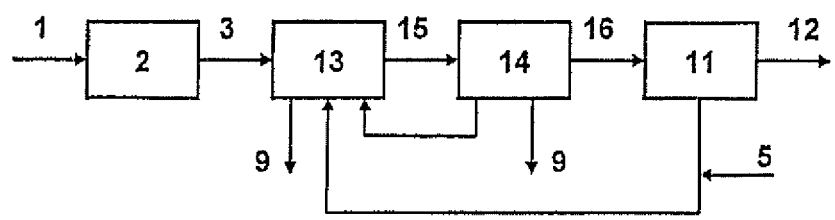
FIG. 3—Block diagram of a third embodiment of the method for treating sewage sludge.

FIG. 3 shows a third embodiment of the method for treating sewage sludge and for removing phosphate, which, in terms of the implementation of the method, is comparable with the embodiment according to FIG. 2. Here too, a subquantity of at least partially digested and already hydrolyzed sewage sludge from the digestion is fed to the step of removal of phosphate or phosphate-containing mixtures, more particularly MAP 9.

In this embodiment, the removal of phosphate is achieved by precipitation in a separate anaerobic high-load digestion 13 and also in a downstream mechanical separation stage 14 for the sewage sludge 15 containing MAP crystals that is now already partially digested in the high-load digestion 13. The low-phosphate, partially digested sewage sludge 16 is subsequently fed to a step of digestion 4 in a digestion vessel, from which partially digested sewage sludge is recycled into the stage for the anaerobic high-load digestion 13.

Similarly, there is recirculation of a subquantity of phosphate-containing mixtures, more particularly MAP, from the mechanical separation stage 14 into the anaerobic high-load digestion 13, especially in order to improve the crystallization.

In the method according to FIGS. 2 and 3, from already digested sewage sludge from the downstream digestion 11, a subquantity is thus mixed in an optimal ratio with the hydrolyzed sewage sludge 3, preferably in a separate vessel, and so an appropriately higher pH is set and also a sufficient quantity of ammonium for the precipitation of MAP is provided. The missing quantity of magnesium ions is preferably supplied as magnesium oxide or magnesium hydroxide.

If the pH in the range of 7.6 to 8 necessary for the precipitation of MAP is not reached, a pH increase can be brought about by air injection (stripping of CO-d or addition of sodium hydroxide solution.

The cristallizer 4 which is envisaged in FIGS. 1 and 2 and which is upstream of the digestion 11 forms the MAP crystals, which can be removed by appropriate measures and are made available for a further use, for example as fertilizer, after appropriate purification. The hydrolyzed and low-phosphate sewage sludge mixture 10 fed to the digestion 11 is depleted in phosphate by these measures to such an extent that the undesired crystallizations no longer take place and also the sludge properties are distinctly improved with regard to the dewatering of sludge.

As an alternative to the recirculation of digested sewage sludge, the requirements for MAP crystallization can also be met by addition of sludge water which arises during the dewatering of sludge.

Another alternative is shown in FIG. 1 by the addition of aqueous ammonia solution. In both cases, the pH can be upwardly corrected if needed by alkali addition. In this case, the addition of magnesium ions as metal salt is necessary for the precipitation of MAP.

The embodiment shown in FIG. 3, in which the precipitation of MAP is carried out in a high-load anaerobic stage with simultaneous MAP precipitation 13, has the advantage that methane-containing digester gas is simultaneously generated. The longer residence time of the hydrolysate in said anaerobic high-load stage 13 compared to the pure precipitation reactor additionally allows the generation and removal of larger, sedimentable crystals. Moreover, the partial digestion of the hydrolysate 3 releases sufficient ammonium, making it possible to minimize the recirculation of digestor sludge from the stage of digestion 11. A further advantage is that, as a result of the partial degradation of the organic acids which arise during the hydrolysis 2, a sufficient pH shift already takes place.

With the three embodiments, it is possible to improve the acquisition of phosphate as phosphate-containing mixture MAP, it being possible to achieve, besides the increased yield of MAP, increased digestor gas production, increased energy efficiency of sludge pretreatment measures (inter alia, mechanical and thermal, combined with or without chemical and enzymatic hydrolysis) and also minimization of the use of chemicals for pH adjustment.

What is achieved by connecting the removal of phosphate between the hydrolysis 2 and the digestion 11 is that the biological degradability of the hydrolysate in the digestion vessel is improved by the preceding precipitation of MAP. In addition, the precipitation of MAP in the hydrolysate creates leeway for lowering of temperature in the hydrolysis 2 without losses in the digestor gas yield. As a result, it is possible to further minimize the proportion of poorly degradable substances which, for example, are generated during the thermal or chemical-thermal hydrolysis. Moreover, a distinctly more energy efficient and increasingly material-protective hydrolysis 2 is made possible as a result.

In principle, there are two ways of removing phosphate, for example in the form of the phosphate-containing mixture MAP, from the hydrolysate. This can be effected either from sewage sludge mixture or from sludge water after prior solid-liquid separation.

The removal of MAP from sludge mixture has the advantage that the ratio of crystal structure to sludge particle structure in the precipitation of MAP in the hydrolysate allows an improved removal of MAP crystals by machine, for example by means of a centrifuge decanter, from the sludge mixture and thus a higher yield. In addition, failures in the removal of MAP by machine are avoided because the crystal structure is relatively fine compared to the precipitation of MAP after the digestion 11 and no large crystals are grown.

The removal of MAP from sludge water has the advantage that a crystal size adapted to requirements can be grown. This offers the possibility of simple sedimentation or filtration of the crystals to be removed. Compared to the precipitation after the digestion 11, it is likewise possible to generate a relatively fine and homogeneous crystal structure, favoring the efficiency of removal. In addition, it is possible to obtain largely clean crystals, which do not require additional processing.

Figure 4:
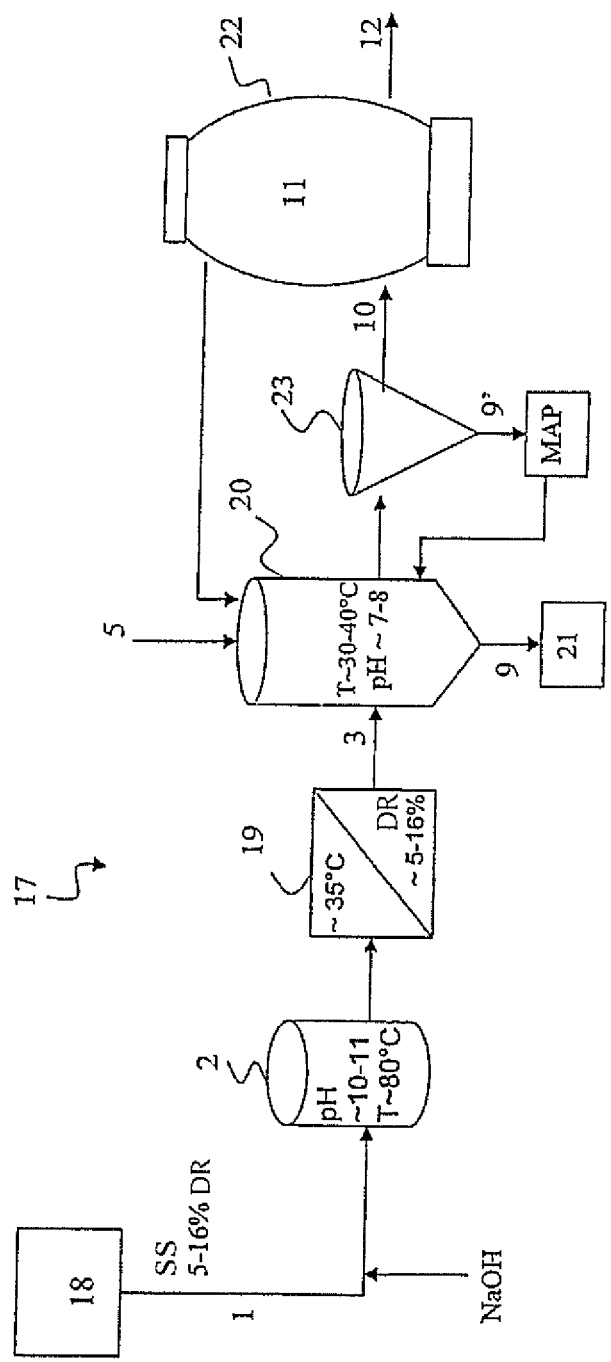
FIG. 4—Outline of a first embodiment of a wastewater treatment plant for treating sewage sludge and removing phosphate.

FIG. 4 shows a first embodiment of a wastewater treatment plant 17 for treating sewage sludges in the form of surplus sludge. Said embodiment envisages an apparatus 18 for thickening surplus sludge SS. Present at the outlet of the apparatus 18 is surplus sludge containing a dry residue DR in the range of about 5 to 16%. Sodium hydroxide solution NaOH is fed to the thickened surplus sludge in order to attain a pH of about 10 to 11. The thus processed surplus sludge is then fed to a hydrolysis reactor 2, in which a chemical/thermal hydrolysis is carried out at a pH of about 11 and a temperature of about 80° C. The so-called Pondus method, for example, is suitable for this purpose. After cooling of the hydrolyzed sewage sludge 3 in a cooling apparatus 19 to a temperature of about 30° C. to 40° C., the hydrolyzed sewage sludge 3 is fed to a precipitation reactor 20, in which crystallization of magnesium ammonium phosphate (MAP) and MAP precipitation is carried out at a temperature in the range of 30° C. to 40° C. and a pH of more than 7 and preferably about 7.5 to 8.5. The precipitated phosphate-containing mixture 9 in the form of MAP is subsequently fed to a processing unit 21, for example a MAP wash.

To allow the crystallization and precipitation of MAP, precipitant 5, for example in the form of magnesium chloride $MgCl_2$, is supplied.

Moreover, a subquantity of at least partially digested sewage sludge from a subsequent digestion vessel 22 is provided for the hydrolyzed and phosphate-reduced sewage sludge in the precipitation reactor 20. The recirculation of digestor sludge preferably takes place at a temperature of about 35° C. to 40° C. and preferably about 37° C.

Connected to the output of the precipitation reactor 20 is a solid/liquid separation stage 23 (e.g., a centrifuge), in which fine-grain MAP 9' is obtained and recycled into the precipitation reactor 20. This second sedimentation leads to an increase in the yield of MAP by improving the crystallization in the precipitation reactor 20.

The digestor sludge 12 obtained after the digestion 11 can then be subjected to further processing, for example by means of dewatering.

Figure 5:
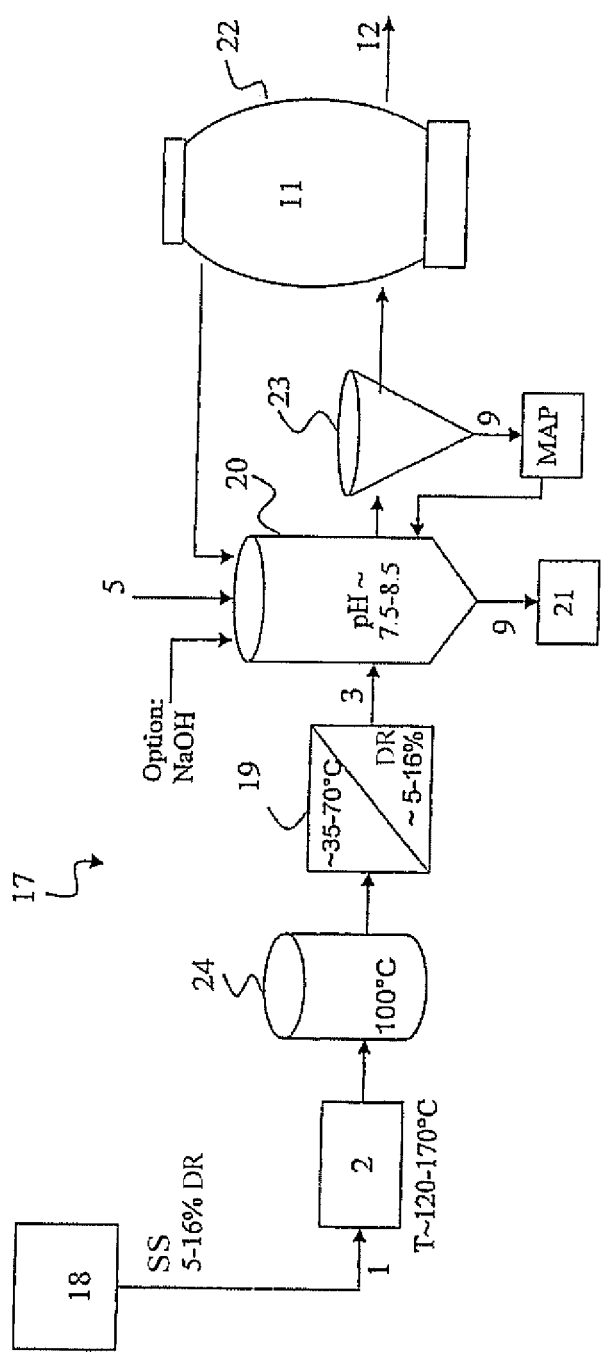
FIG. 5—Outline of a second embodiment of a wastewater treatment plant for treating sewage sludge and removing phosphate.

FIG. 5 shows a second embodiment of a wastewater treatment plant 17, in which surplus sludge is again thickened in an apparatus 18 to a dry residue of 5 to 16%. This sewage sludge 1 in the form of surplus sludge SS thickened in this way is subjected, in a hydrolysis reactor 2, to the thermal hydrolysis at a temperature of 120-160° C. During the heat treatment, orthophosphate is produced in the hydrolysate. After intermediate storage 2 at 100° C., the hydrolyzed sewage sludge is cooled down in a cooling apparatus 19 to about 35° C. to 70° C. The dry residue DR of the hydrolyzed sewage sludge 3 is about 5 to 16%. The hydrolyzed sewage sludge 3 is then fed into a precipitation reactor 20, in which the crystallization and precipitation of phosphate, especially as phosphate-containing mixture MAP, takes place. To adjust the pH required for the precipitation of MAP to about 7.5 to 8.5, sodium hydroxide NaOH is added if necessary to the precipitation reactor 20. In addition, precipitant is added, for example in the form of magnesium chloride $MgCl_2$ or magnesium oxide MgO or of magnesium hydroxide $Mg(OH)_2$.

Moreover, there is recirculation of at least partially digested sewage sludge from the step of the digestion 11 in the digestion vessel 22.

In a solid/liquid separation stage 23 downstream of the precipitation reactor 20, further removal of MAP crystals, for example by means of sedimentation, is performed, which crystals are returned to the precipitation reactor 20.

In the embodiment according to FIG. 5, the MAP obtained in the precipitation reactor 20 can be subjected to further processing, for example by means of a MAP wash.

The digestor sludge 12 from the digestion vessel 22 can be subjected to dewatering or other further processing.

The wastewater treatment plant 17 in FIG. 4 envisages hydrolysis at an elevated temperature of greater than 60° C., preferably in the range of 70° C. to 80° C., and at elevated pH levels of greater than 8, preferably in the range of 10 to 12, and in FIG. 5, hydrolysis at an elevated temperature of greater than 100° C., preferably 120° C. to 170° C., is envisaged. Subsequently, the proportion of phosphate is then reduced before the digestion.

Figure 6:
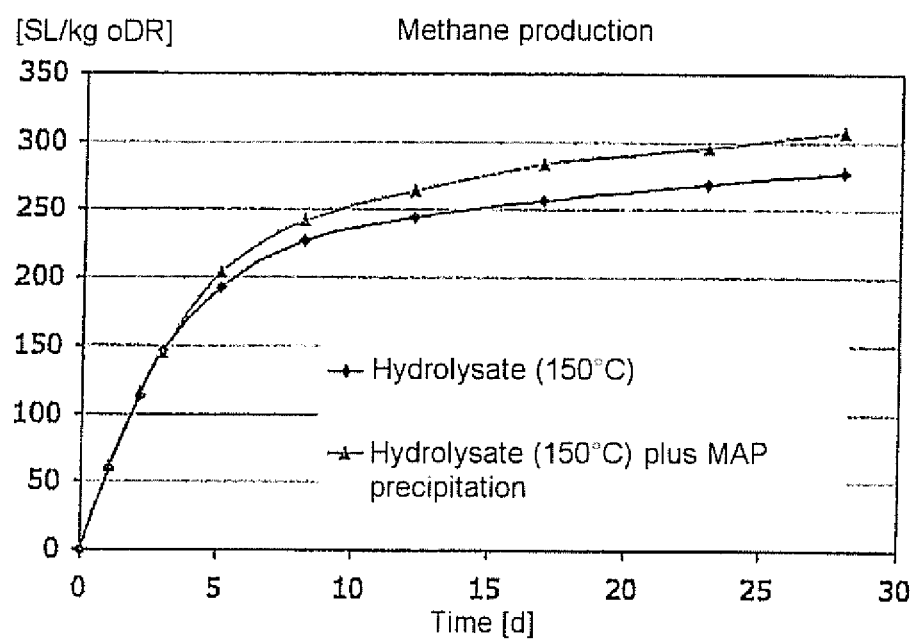
FIG. 6—Graph of the yield of methane gas over time with and without preceding removal of MAP.

FIG. 6 shows a graph of the yield of methane gas over time d in days with and without preceding precipitation of MAP. It is clear that the methane gas yield, measured in the digestion in SL/kg oDR, i.e., in standard liters of methane per kilogram of organic dry substance, from sludge (hydrolysate) thermally hydrolyzed at 150° C. is, surprisingly, about 12% higher when the hydrolysate undergoes magnesium ammonium phosphate (MAP) precipitation before the digestion.

The invention claimed is:

1. A method for treating sewage sludge, comprising the treatment steps of
    hydrolysis of sewage sludge to produce sewage sludge hydrolysate;
    digestion of the sewage sludge hydrolysate by anaerobic digestion to produce digested sewage sludge;
    recirculation of a sub-quantity of the digested sewage sludge from the digested sewage sludge which is semi-anaerobically digested to the sewage sludge hydrolysate;
    separation of solid phase and liquid phase from the sewage sludge hydrolysate, said separation producing at least partially treated sewage sludge with phosphate in the liquid phase of the sewage sludge hydrolysate; and
    removal of phosphate from the liquid phase of the sewage sludge hydrolysate;
    wherein the recirculation of the sub-quantity of digested sewage sludge to the sewage sludge hydrolysate proceeding before or during the removal step increases ammonium content in and raises the pH of the sewage sludge hydrolysate or the liquid phase of the sewage sludge hydrolysate.

2. The method as claimed in claim 1, wherein the removal of phosphate is achieved by precipitation with addition of metal salts to the hydrolyzed sewage sludge.

3. The method of claim 2 wherein the metal salts includes magnesium.

4. The method as claimed in claim 1, wherein the removal of phosphate is achieved by precipitating magnesium ammonium phosphate crystals from the hydrolyzed sewage sludge.

5. The method as claimed in claim 1, wherein the sub-quantity is liquid removed from the digested sewage sludge.

6. The method as claimed in claim 1, wherein the sewage sludge subjected to the treatment steps of hydrolysis, separation, removal of phosphate, and digestion is at least one of surplus sludge and primary sludge.

7. A wastewater treatment plant for treating sewage sludges using the method as claimed in claim 1, comprising:
    a hydrolysis apparatus for the hydrolysis treatment of sewage sludge, a separation apparatus for separating of solid phase and liquid phase from sewage sludge hydrolysate,
    a digestion vessel for the anaerobic treatment of sewage sludge by digestion, wherein the separation apparatus is connected between the hydrolysis apparatus and the digestion vessel, and is configured so phosphate is subtracted from the sewage sludge hydrolysate and the sewage sludge having a reduced portion of phosphate as a result of the removal of phosphate is fed to the digestion vessel; and
    a recirculation system for recirculation of a sub-quantity of at least partially digested sewage sludge removed from the at least partially digested sewage sludge treated at least semi-anaerobically in the digestion vessel to return to the separation apparatus,
    wherein said recirculation to the separation apparatus increases the ammonium content and raises the pH of a sewage sludge hydrolysate therein for removal of phosphate crystals.

8. The wastewater treatment plant as claimed in claim 7, wherein the hydrolysis apparatus is set up for the hydrolysis treatment of sewage sludge in such a way that either or both
    a pH of the hydrolyzed sewage sludge is more than 7, and
    a temperature of the hydrolyzed sewage sludge during the hydrolysis is >60° C.

9. The wastewater treatment plan as claimed in claim 8 wherein the temperature of the sewage sludge hydrolysate ranges from 70° C. to 90° C.

10. The wastewater treatment plant as claimed in claim 8 wherein the pH ranges from 10 to 12.

11. The wastewater treatment plant as claimed in claim 7, wherein the hydrolysis apparatus is set up for the hydrolysis treatment of sewage sludge in such a way that a temperature of the sewage sludge or sewage sludge hydrolysate during the hydrolysis is more than 100° C.

12. The wastewater treatment plant as claimed in claim 11 wherein the temperature of the sewage sludge hydrolysate ranges from 120° C. to 170° C.

* * * * *